US010962996B2

(12) United States Patent
Silva et al.

(10) Patent No.: US 10,962,996 B2
(45) Date of Patent: *Mar. 30, 2021

(54) CONFIGURING A SYSTEM OF COMPONENTS USING GRAPHICAL PROGRAMMING ENVIRONMENT

(71) Applicant: Savant Systems, Inc., Hyannis, MA (US)

(72) Inventors: Michael C. Silva, East Sandwich, MA (US); Robert P. Madonna, Osterville, MA (US); Kevin C. Kicklighter, Cottonwood, UT (US); Bryan S. Bonczek, Brooklyn, NY (US); David M. Benvenuti, Somerville, MA (US); Arthur A. Jacobson, Centerville, MA (US); Nicholas Cippolo, Boston, MA (US); Gerald W. Shields, Wilton, NH (US)

(73) Assignee: Savant Systems, Inc., Hyannis, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/383,253

(22) Filed: Apr. 12, 2019

(65) Prior Publication Data

US 2019/0235539 A1    Aug. 1, 2019

Related U.S. Application Data

(63) Continuation of application No. 14/660,323, filed on Mar. 17, 2015, now Pat. No. 10,261,529, which is a
(Continued)

(51) Int. Cl.
*G06F 3/048* (2013.01)
*G05D 23/19* (2006.01)
(Continued)

(52) U.S. Cl.
CPC ..... *G05D 23/1917* (2013.01); *G06F 3/04842* (2013.01); *H04L 12/2809* (2013.01);
(Continued)

(58) Field of Classification Search
None
See application file for complete search history.

(56) References Cited

U.S. PATENT DOCUMENTS 6,061,602 A     5/2000 Meyer
6,182,094 B1 *  1/2001 Humpleman ....... H04L 12/2803
                                            348/E5.006
(Continued)

FOREIGN PATENT DOCUMENTS

CN    1452390 A    10/2003
CN    1496060 A    5/2004
(Continued)

OTHER PUBLICATIONS

"Crestron SIMPL Windows," Crestron Electronics, Inc., Nov. 1, 2003, pp. 1-76.
(Continued)

*Primary Examiner* — Thanh T Vu
(74) *Attorney, Agent, or Firm* — Cesari and McKenna, LLP; James A. Blanchette

(57) ABSTRACT

In one embodiment, graphical programming is used to configure a system of audio, video, lighting, HVAC and/or security components. Representations of components from a component library are displayed. Each representation of a component corresponds to a physical component that is available for inclusion in the system and associated with a corresponding component profile for that physical component that includes information regarding the component's capabilities. A selected plurality of representations of components from the component library are placed in a con-
(Continued)

figuration workspace of the graphical user interface, to indicate their inclusion in the system. One or more realized services that the system is capable of providing are determined based on the selected plurality of components; and indications of the one or more realized services that the system is capable of providing are displayed to the user.

19 Claims, 15 Drawing Sheets

Related U.S. Application Data continuation of application No. 13/042,238, filed on Mar. 7, 2011, now Pat. No. 8,997,011, which is a continuation of application No. 11/520,215, filed on Sep. 13, 2006, now Pat. No. 7,930,644.

(51) Int. Cl.
    *H04L 12/28*     (2006.01)
    *H04L 12/24*     (2006.01)
    *H04L 29/08*     (2006.01)
    *H04N 5/765*     (2006.01)
    *G06F 3/0484*     (2013.01)

(52) U.S. Cl.
    CPC .......... *H04L 41/0803* (2013.01); *H04L 41/22* (2013.01); *H04L 67/06* (2013.01); *H04N 5/765* (2013.01); *H04L 41/0853* (2013.01); *H04L 41/20* (2013.01)

(56) References Cited

U.S. PATENT DOCUMENTS

| | | | |
|---|---|---|---|
| 6,266,098 | B1 | 7/2001 | Cove et al. |
| 6,313,880 | B1 | 11/2001 | Smyers et al. |
| 6,469,633 | B1 | 10/2002 | Wachter |
| 7,103,660 | B2 | 9/2006 | Nakamura |
| 7,234,115 | B1* | 6/2007 | Sprauve ............... H04L 12/66 715/744 |
| 7,330,189 | B2 | 2/2008 | Nichogi et al. |
| 7,930,644 | B2 | 4/2011 | Silva et al. |
| 8,060,588 | B2 | 11/2011 | Yook et al. |
| 8,997,011 | B2 | 3/2015 | Silva et al. |
| 9,153,125 | B2 | 10/2015 | Madonna et al. |
| 9,183,560 | B2 | 11/2015 | Abelow |
| 2001/0011284 | A1 | 8/2001 | Humpleman et al. |
| 2003/0035010 | A1 | 2/2003 | Kodosky et al. |
| 2003/0088852 | A1 | 5/2003 | Lacas et al. |
| 2003/0101459 | A1 | 5/2003 | Edson |
| 2003/0103088 | A1 | 6/2003 | Dresti et al. |
| 2003/0151538 | A1 | 8/2003 | Escobosa et al. |
| 2004/0031019 | A1 | 2/2004 | Lamanna et al. |
| 2004/0054789 | A1 | 3/2004 | Breh et al. |
| 2004/0059716 | A1 | 3/2004 | Shiraishi et al. |
| 2004/0143349 | A1 | 7/2004 | Roberts et al. |
| 2004/0260407 | A1 | 12/2004 | Wimsatt |
| 2004/0261116 | A1 | 12/2004 | Mckeown et al. |
| 2004/0267914 | A1 | 12/2004 | Roe et al. |
| 2005/0021714 | A1 | 1/2005 | Yook et al. |
| 2005/0074018 | A1 | 4/2005 | Zintel et al. |
| 2005/0125564 | A1 | 6/2005 | Bushmitch et al. |
| 2005/0251747 | A1 | 11/2005 | Dolling et al. |
| 2006/0158838 | A1 | 7/2006 | Kinoshita et al. |
| 2007/0044073 | A1 | 2/2007 | Kornerup et al. |
| 2007/0055976 | A1* | 3/2007 | Ward .................. G06F 3/0482 719/329 |
| 2007/0142022 | A1 | 6/2007 | Madonna et al. |
| 2007/0143801 | A1 | 6/2007 | Madonna et al. |
| 2007/0214427 | A1 | 9/2007 | Peck et al. |
| 2008/0126936 | A1 | 5/2008 | Williams |
| 2009/0076821 | A1* | 3/2009 | Brenner ............... G06F 16/685 704/260 |
| 2011/0167348 | A1 | 7/2011 | Silva et al. |
| 2015/0192940 | A1 | 7/2015 | Silva et al. |

FOREIGN PATENT DOCUMENTS

| | | |
|---|---|---|
| CN | 1501267 A | 6/2004 |
| EP | 727909 A2 | 8/1996 |
| EP | 1355485 A1 | 11/2003 |
| EP | 1548740 A2 | 6/2005 |
| EP | 1617333 A1 | 1/2006 |
| JP | 08-079847 | 3/1996 |
| JP | 2000-197162 | 7/2000 |
| JP | 2002-509669 | 3/2002 |
| JP | 2003-198871 | 7/2003 |
| JP | 2004-194011 | 7/2004 |
| JP | 2005-122271 | 5/2005 |
| JP | 2006-227135 | 3/2006 |
| KR | 1020010014271 A | 2/2001 |
| RU | 2112325 C1 | 5/1998 |
| RU | 2237275 C2 | 9/2004 |
| RU | 2321892 C2 | 4/2008 |
| WO | WO-94/14282 A1 | 6/1994 |
| WO | WO-1998/059284 A2 | 12/1998 |
| WO | WO-99/06910 A1 | 2/1999 |
| WO | WO 00/17737 | 3/2000 |
| WO | WO-03/019560 A2 | 3/2003 |
| WO | WO 03/044625 A2 | 5/2003 |
| WO | WO-03/098847 A1 | 11/2003 |
| WO | WO-2005/107408 A1 | 11/2005 |

OTHER PUBLICATIONS

"DME Designer Version 2.0: Owner's Manual," Yamaha Corporation, 2004, pp. 1-482.
"Invitation to Pay Additional Fees," International Filing Date: Sep. 13, 2007, International Application No. PCT/US2007/019912, Applicant: Savant Systems LLC, dated Mar. 11, 2008, pp. 1-4.
National Instruments Corporation: "Labview User Manual," XP002227650, Jul. 2000, pp. 1-7.
Nishiyma, et al., "Next Generation Home Network Service: Operation Service Coordination Technique Designed for Home Network Operation Support," NTT Gijutsu Journal, Japan, The Telecommunications Association, Nov. 1, 2004, vol. 16, No. 11, pp. 16-19.
"Notification of Transmittal of the International Search Report and the Written Opinion of the International Searching Authority, or the Declaration," International Filing Date: Dec. 20, 2006, International Application No. PCT/US2006/048655, Applicant: Savant Systems LLC, dated Sep. 6, 200, pp. 1-15.
"Notification of Transmittal of the International Search Report and the Written Opinion of the International Searching Authority, or the Declaration," International Filing Date: Sep. 13, 2007, International Application No. PCT/US2007/019912, Applicant: Savant Systems LLC, dated May 13, 2008, pp. 1-18.
"Notification of Transmittal of the International Search Report and the Written Opinion of the International Searching Authority, or the Declaration," International Filing Date: Mar. 14, 2008, International Application No. PCT/US2008/003434, Applicant: Savant Systems LLC, dated Sep. 19, 2008, pp. 1-12.

* cited by examiner

CONFIGURING A SYSTEM OF COMPONENTS USING GRAPHICAL PROGRAMMING ENVIRONMENT

RELATED APPLICATIONS

This application is a continuation of U.S. patent application Ser. No. 14/660,323 filed on Mar. 17, 2015, entitled "Configuring a System of Components Using Graphical Programming Environment Having a Zone Map" by Michael C. Silva et al., which is a continuation of U.S. patent application Ser. No. 13/042,238 filed on Mar. 7, 2011, entitled "Programming Environment for Configuring a System of Audio/Video Components," by Michael C. Silva et al., now issued as U.S. Pat. No. 8,997,011, which is itself a continuation of U.S. patent application Ser. No. 11/520,215 filed on Sep. 13, 2006, entitled "Programming Environment and Metadata Management for Programmable Multimedia Controller," by Michael C. Silva et al., now issued as U.S. Pat. No. 7,930,644, all of which are hereby incorporated by reference in their entirety.

This application is also related to the application entitled "System and Method for a Programmable Multimedia Controller," filed Dec. 20, 2005, Ser. No. 11/314,664, and the application entitled "Programmable Multimedia Controller With Programmable Services," filed Dec. 20, 2005, Ser. No. 11/314,112, both of which are hereby incorporated by reference in their entireties.

BACKGROUND OF THE INVENTION

Field of the Invention

The present invention relates generally to the fields of multimedia and communications and, more specifically, to a programmable multimedia controller for home, commercial, professional audio or video, broadcast or film studio, security, automation or other use which is capable of interfacing with, controlling and managing a wide variety of audio, video, telecommunications, data communications and other devices.

Background Information

Commercial offerings of consumer electronic devices have expanded dramatically in response to the falling cost of electronic hardware and introduction of new media. For example, within only a few years, compact disk (CD) technology largely displaced vinyl records and magnetic tapes as the music recording medium of choice, but was in turn displaced by MP3 technology. Similarly, digital versatile disk (DVD) technology largely displaced videotape as the video recording medium of choice, while digital cameras have effectively replaced film cameras. The advent of new technologies and media, and the corresponding consumer demand for products based on the latest advances, drives manufacturers to rapidly introduce new products. As a result, an overwhelming number of product types and models permeate the market.

One long-standing problem which persists for many consumers is the complexity involved with interconnecting various electronic devices which are typically sold individually and not as parts of an integrated system. For example, a consumer may acquire an audio receiver, cable TV box, television, DVD player and surround sound system made by different manufacturers. The basic problem of interconnecting a group of components by a series of cables is challenging for many users, let alone sufficiently understanding the various modes of operations and features which, if properly used, will allow the components to work best together and produce the most enjoyable entertainment experiences.

Another long-standing problem with most, if not all, previous approaches to integrating disparate components is that some type of central controller is used which operates on software written in a high-level computer language. The use of a high-level computer language presents several difficulties. First, it is all but certain that the manufacturer will not make the source code available to the user, thus effectively preventing a user who wished to customize a system from doing so. Second, even if the source code is made available, the overwhelming majority of users do not have the technical expertise, time or inclination to write or modify source code. Third, the introduction of new devices by manufacturers almost certainly necessitate that the source code be modified in order to make the central controller compatible with such devices.

Yet another long-standing problem is an absence of any widely adopted industry standard regarding control interfaces for consumer electronics devices. Manufacturers have incorporated varying communication protocols, most of which are proprietary in nature, do not conform to any standard, and are implemented with extremely detailed source code. This absence of standards greatly complicates the problem of how to integrate and centrally control a wide variety of consumer electronics devices such that they work together and are manageable by an average user who does not possess substantial technical expertise.

SUMMARY OF THE INVENTION

In brief summary, the present invention provides a multimedia controller, based on a general purpose computer, which is capable of interfacing with, controlling or managing a wide variety of audio, video, telecommunications, data communications or other devices. In accordance with one aspect of the present invention, a configuration tool, based on a graphical user interface, provides a simple, schematic way to configure even highly complex systems having numerous components or devices which are to be interconnected with or interfaced to the multimedia controller.

The configuration tool has access to a library of component profiles. A component profile typically describes at least some of the physical characteristics of the component, the configuration of the component, the set of commands that the component recognizes, as well as the functions that the component is capable of performing. In one embodiment, the component library may be updated through on-line access to a designated website or on-line service.

Using the configuration tool, a user, dealer, installer or other person selects, typically be dragging and dropping, components of interest from the component library. In response, a photo or other image of each component and its connectors, including the connector names present on the physical component, is displayed. As multiple components are selected, the configuration tool uses color coding to graphically and visually indicate possible connections among the components. For example, an audio output connector of one component may be highlighted with the same color as a compatible audio input connector of another component. The configuration tool may also be used to select a connector of interest and display information regarding permissible and impermissible connections for that connector.

Working interactively with the displayed components, a user graphically "draws" desired connections between components. Once the desired connections are specified all component and connection information is supplied to a configuration compiler. The configuration compiler produces a list of services that the multimedia controller is capable of providing based on the specified components and configuration. A user may select desired services as well as customize various services to suit individual preferences.

The configuration tool may also generate an output report which contains detailed wiring or installation instructions for an installer; a component summary; a bill of materials for ordering and billing purposes; configuration instructions; information regarding third party equipment, such as input assignment settings for receivers; user notes; printed labels for cabling and other information.

In accordance with another aspect of the invention, the configuration tool and graphical user interface may be used to configure individual components or devices which interface with the programmable multimedia controller including a touchscreen remote control.

In accordance with another aspect of the invention, the multimedia controller includes a metadata management facility which is capable of working with diverse media types including CD, MP3 among others. In one embodiment, the metadata management facility automatically collects metadata that is available within the multimedia controller, automatically detects the presence of new media and collects metadata from it, and may also access web resources to locate additional pertinent metadata. By making use of a file system associated with the general purpose computer that is part of the multimedia controller, the metadata manager facility stores metadata in a structure which is well suited for queries. In addition, the metadata manager facility makes metadata available to all types of user remote controllers which may be interfaced with the multimedia controller.

In accordance with yet another aspect of the invention, a graphical programming environment is provided which enables a user to customize the appearance and functionality of a user interface to the multimedia controller. The graphical programming environment includes a library of radio buttons and other graphical controls which are accessible through an application programming interface (API). Through the API, a user may add or remove a radio button or control from the user interface as well as modify the appearance, functionality or other attributes of the button or control.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
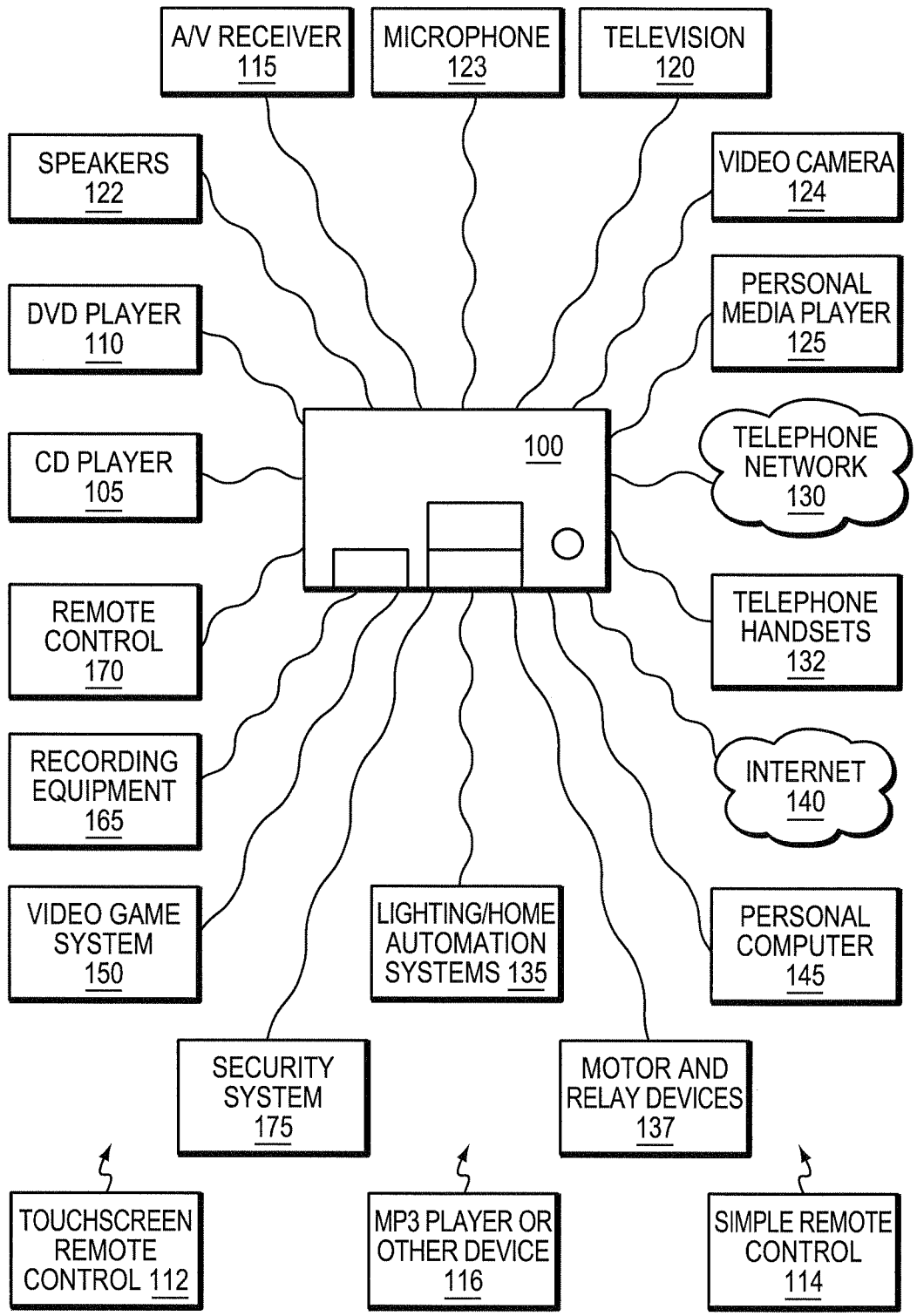
FIG. 1 is block diagram of a programmable multimedia controller, interconnected to a number of devices, according to an illustrative embodiment of the present invention.

FIG. 1 is a block diagram of a programmable multimedia controller 100, interconnected to a number of devices, according to an illustrative embodiment of the present invention. The term "programmable multimedia controller" should be interpreted broadly as a device capable of controlling, switching data between, and/or interoperating with a variety of electronic devices, such as audio, video, telephony, data, security, motor-driven, relay-driven, and/or other types of electronic devices . . . . By interacting with these devices the programmable multimedia controller may implement an integrated multimedia control solution.

In the illustrative embodiment, the programmable multimedia controller 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The programmable multimedia controller may also be connected to telephony devices such as a telephone network 130 and telephone handsets 132. The telephone network 130 may be a publicly switched telephone network (PSTN), an Integrated Services Digital Network (ISDN) or other communications network.

In addition, the programmable multimedia controller may intercommunicate with variety of light and/or home automation systems 135. These devices may operate via the X10 protocol developed by Pico Electronics, the INSTEON™ protocol developed by SmartHome, Inc, the CEBus standard managed by the CEBus Industry Council, or another well known home automation or control protocol. Similarly the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected. Further, one or more remote control units 170 may be provided to manage the controller's functionality, and/or to control devices connected to the controller. Such remote control units may be interconnected to the controller via a wired network connection, an infra-red link, a radiofrequency link, a Bluetooth™ link, a ZigBee™ link or another appropriate data connection. Examples of such remote control units include a touchscreen remote control 112, a simple remote control 114, which may be electromechanical, and an MP3 player or other device 116.

Figure 2:
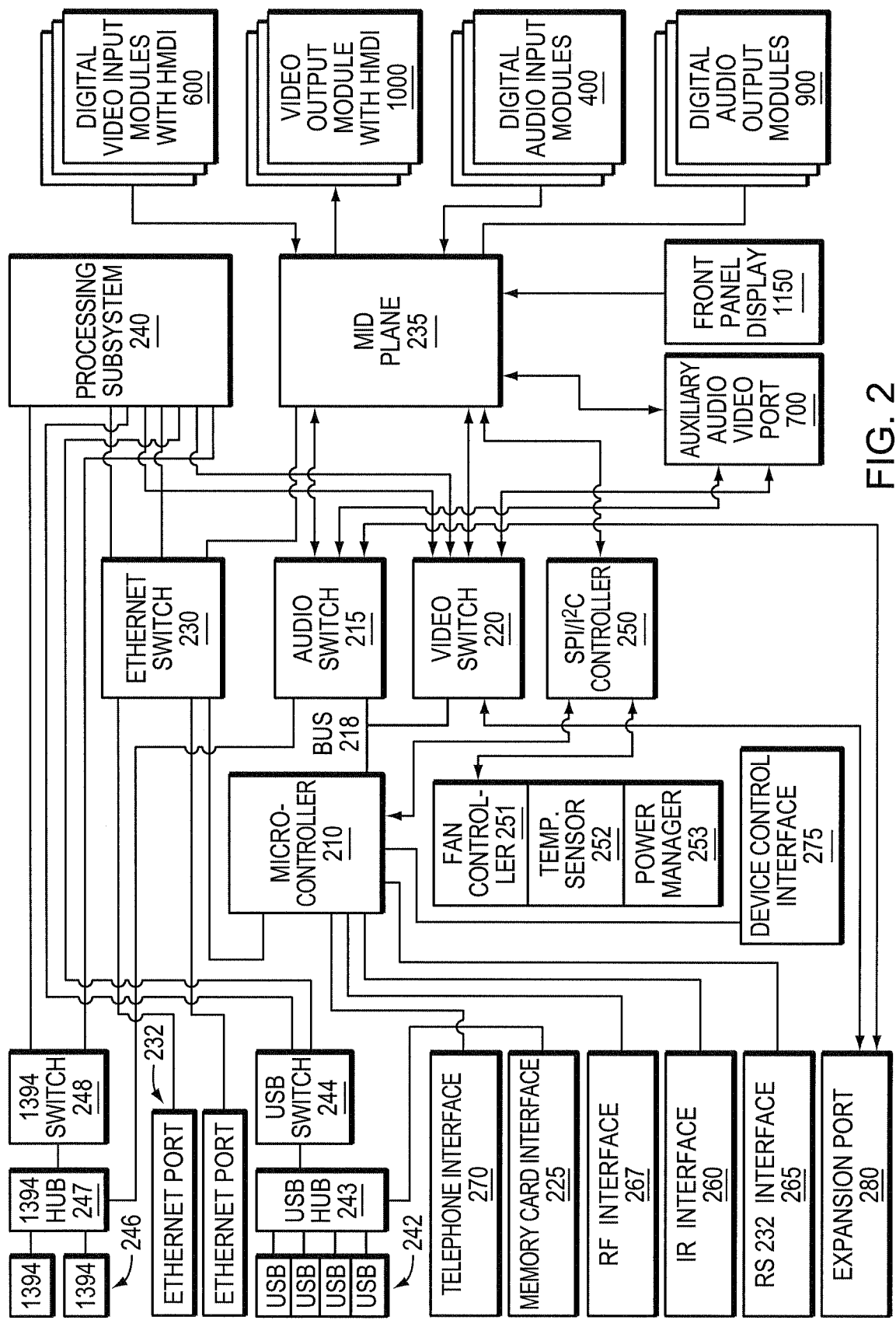
FIG. 2 is a schematic block diagram showing the high-level hardware architecture of the multimedia controller of FIG. 1.

FIG. 2 is a schematic block diagram showing a high-level hardware architecture of the programmable multimedia controller. The various components shown may be arranged on a "motherboard" of the controller, or on a plurality of cards interconnected by a backplane (not shown). A microcontroller 210 manages the general operation of the system. In the illustrative embodiment, the microcontroller is a 32-bit model MCF5234 microcontroller available from Freescale Semiconductor Inc. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals could be employed, for example Time Division Multiplexing (TDM) switches.

A mid plane 235 interconnects the switches and other devices to a variety of input and output modules such as, for example, Digital Video Input Modules with HDMI 600, Video Output Modules with HDMI 1000, Digital Audio Input Modules 400, and Digital Audio Output Modules 900. The mid plane 235 is further coupled to an Ethernet switch 230 that permits switching of 10BaseT, 100BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media.

Also, a number of Universal Serial Bus (USB) ports 242 are interconnected to a USB hub 243 for interconnection to the processing subsystem 240. A memory card interface 225 may also be connected to the USB hub 243. The interface accepts one or more well known memory card formats, for example CompactFlash™ cards, Memory Stick™ cards, Secure Digital™ (SD) cards, or other formats. A USB switch 244 is employed to switch USB links among the multiple processing components that may be present. In a similar manner, a number of IEEE 1394 (FireWire™) ports 246 are interconnected to an IEEE 1394 hub 247 and to an IEEE 1394 switch 248.

The microcontroller 210 is further connected to a Serial Peripheral Interface (SPI) and Inter-Integrated Circuit (I²C) distribution circuit 250, which provides a serial communication interface to relatively low data transfer rate devices. The SPI/I²C controller 250 is connected to the mid-plane connector 235 and thereby provides control commands from the microcontroller 210 to the modules and other devices in the programmable multimedia controller 100. Further connections from SPI/I²C controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits programmable multimedia controller 100 to control external devices. In addition the interfaces may receive control signals that control the operation of the programmable multimedia controller itself. It is expressly contemplated that various other interfaces, including WI-FI, Bluetooth™, ZigBee™ and other wired and wireless interfaces, may be used with the multimedia controller 100.

In addition, an Auxiliary Audio/Video Port 700 is provided for interconnecting one or more video game systems, camcorders, computers, karaoke machines or other devices. A telephone interface 270 is provided for connecting to the PSTN or a private network, and to telephone handsets. Further, a device control interface 275 is provided to communicate with lighting, home automation, and motor and/or relay operated devices. As discussed in more detail below, an expansion port 280 is provided for linking several programmable multimedia controllers together to form an expanded system. Finally, a front panel display 1150 permits presentation of status, configuration, and/or other information to a user. In one embodiment the from panel can display video data originating from any input source connected to the system, such that one may preview video content on the display. In another embodiment the front panel display 1150 includes a touchscreen, and a user may enter control selections by selecting icons on the screen.

Figure 3:
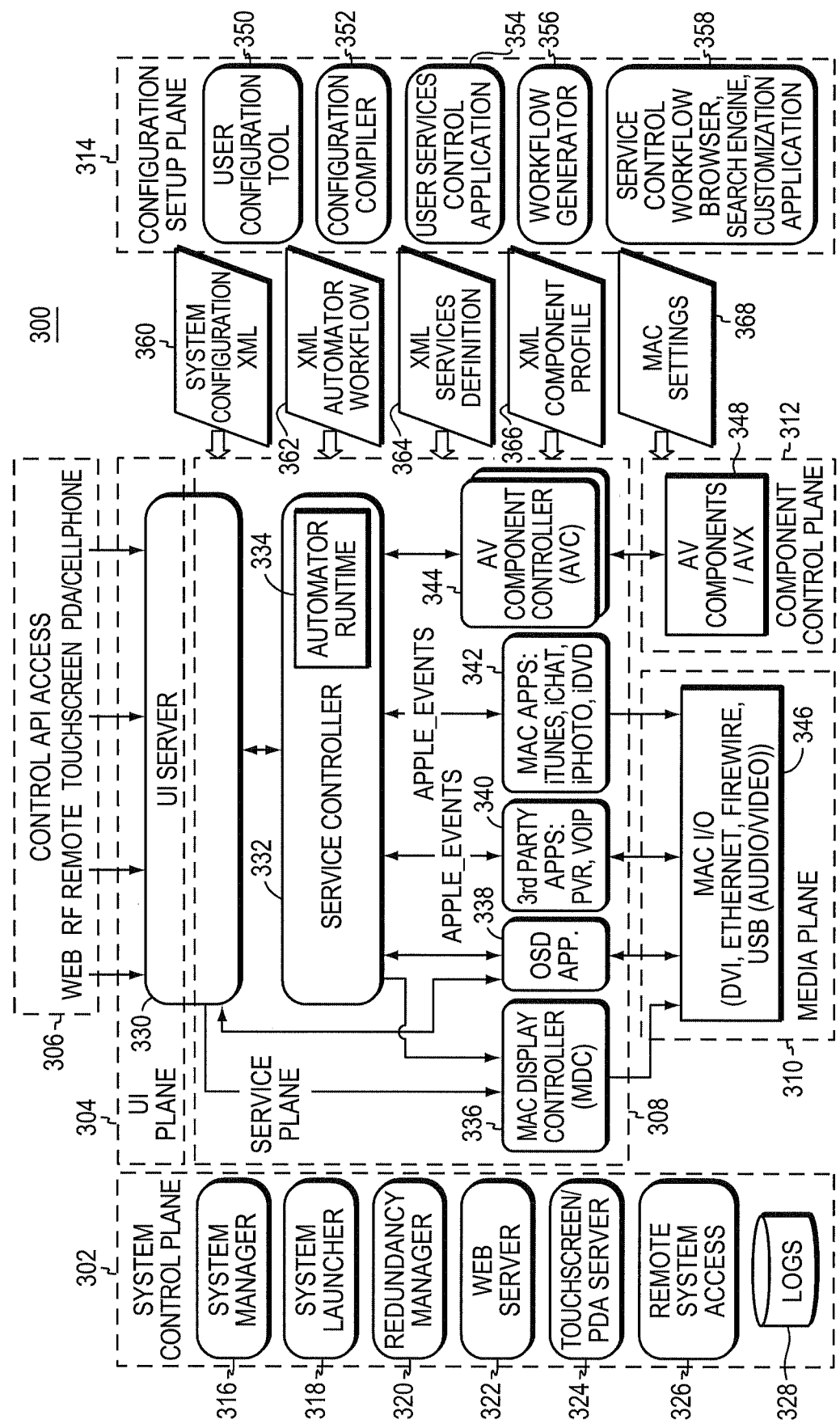
FIG. 3 is a schematic block diagram showing the high-level software architecture of the system of FIG. 1.

FIG. 3 is a block diagram of the high-level software architecture of the controller 100. The software architecture is organized as a series of planes including a system control plane 302, a user interface (UI) plane 304, a control application programming interface (API) access 306, a service plane 308, a media plane 310, a component control plane 312 and a configuration/setup plane 314.

System control plane 302 includes the functionalities of a system manager 316, a system launcher 318, a redundancy manager 320, a web server 322, a touchscreen/PDA server 324, a remote system access manager 326 and system logs 328. UI plane 304 shares a UI server 330 with service plane 308. Service plane 308 includes the functionalities of a service controller 332 which itself includes an automator runtime 334. Service plane 308 also includes the functionalities of a Mac display controller 336, an on-screen display (OSD) application 338, third party applications 340, Mac applications 342 and an audio/video component controller 344. Through automator runtime 334, service controller 332 is capable of controlling Mac applications including iTunes, iChat, iPhoto and iDVD that support Applescript, which enables application-to-application control. Similarly, through automator runtime 334, service controller 332 is capable of controlling other third party applications which support AppleScript.

Media plane 310 includes the functionality of Mac input/output (I/O) in all supported formats (i.e., DVI, Ethernet, FireWire™, USB, etc.). Component control plane 312 includes the functionality of controlling audio/video components 348.

Configuration/setup plane 314 includes the functionalities of a user configuration tool 350, a configuration compiler 352, a user services control application 354, a workflow generator 356 and a service control workflow browser/ search engine/customization application 358. Configuration/setup plane 314 also passes several types of information to UI plane 304 and service plane 308 including system configuration 360, automator workflow 362, services definitions 364, component profiles 366 and Mac settings 368. As described in the above-referenced co-pending application Ser. No. 11/314,112, in a preferred embodiment, XML files are used to represent system configuration 360, automator workflow 362, services definitions 364 and component profiles 366.

Control API access 306 has responsibility for an API through which multimedia controller 100 may be controlled by a user who may choose to use a web-enabled device, an RF remote control type device, a touchscreen, a PDA or cell phone. UI plane 304 has functional responsibility for a user interface to multimedia controller 100. Service plane 308 has functional responsibility for implementing services as described above. Automator runtime 334 is responsible for receiving requests or commands from users and mapping them to a workflow for a particular service.

Media plane 310 has functional responsibility for Mac I/O as well as the other internal and external communications interfaces supported by multimedia controller 100. Component control plane 312 has functional responsibility for controlling the operations of audio or video components which may be interfaced with multimedia controller 100. Configuration/setup plane 314 has functional responsibility for enabling users to configure multimedia controller 100; to select, create or modify services; and to select, create or modify component profiles.

Figure 4:
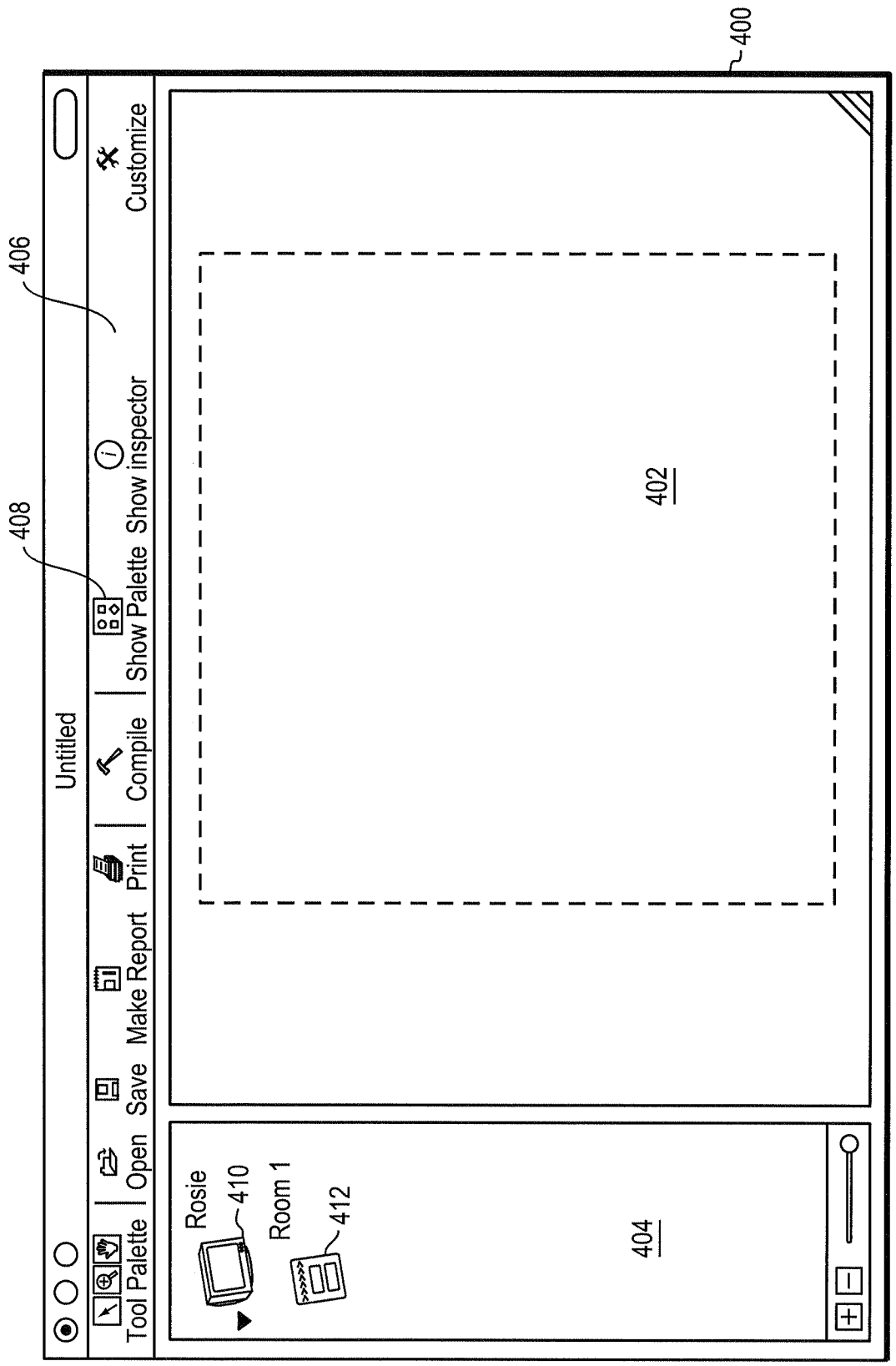
FIG. 4 is a screenshot showing a graphical programming environment in which a user may create a system configuration using the configuration tool of FIG. 3.

FIG. 4 is a screenshot showing how a user would use configuration tool 350 to begin to create a system configuration. Displayed on a screen in a graphical programming environment 400 are a configuration workspace 402, a zone map 404 and a toolbar 406. An icon labeled "Rosie" and denoted by reference number 410 represents a programmable multimedia controller 100 (FIG. 1). An icon labeled "Room 1" and denoted by reference number 412 represents a first zone, which may physically include one or more rooms, within the configuration.

Figure 5:
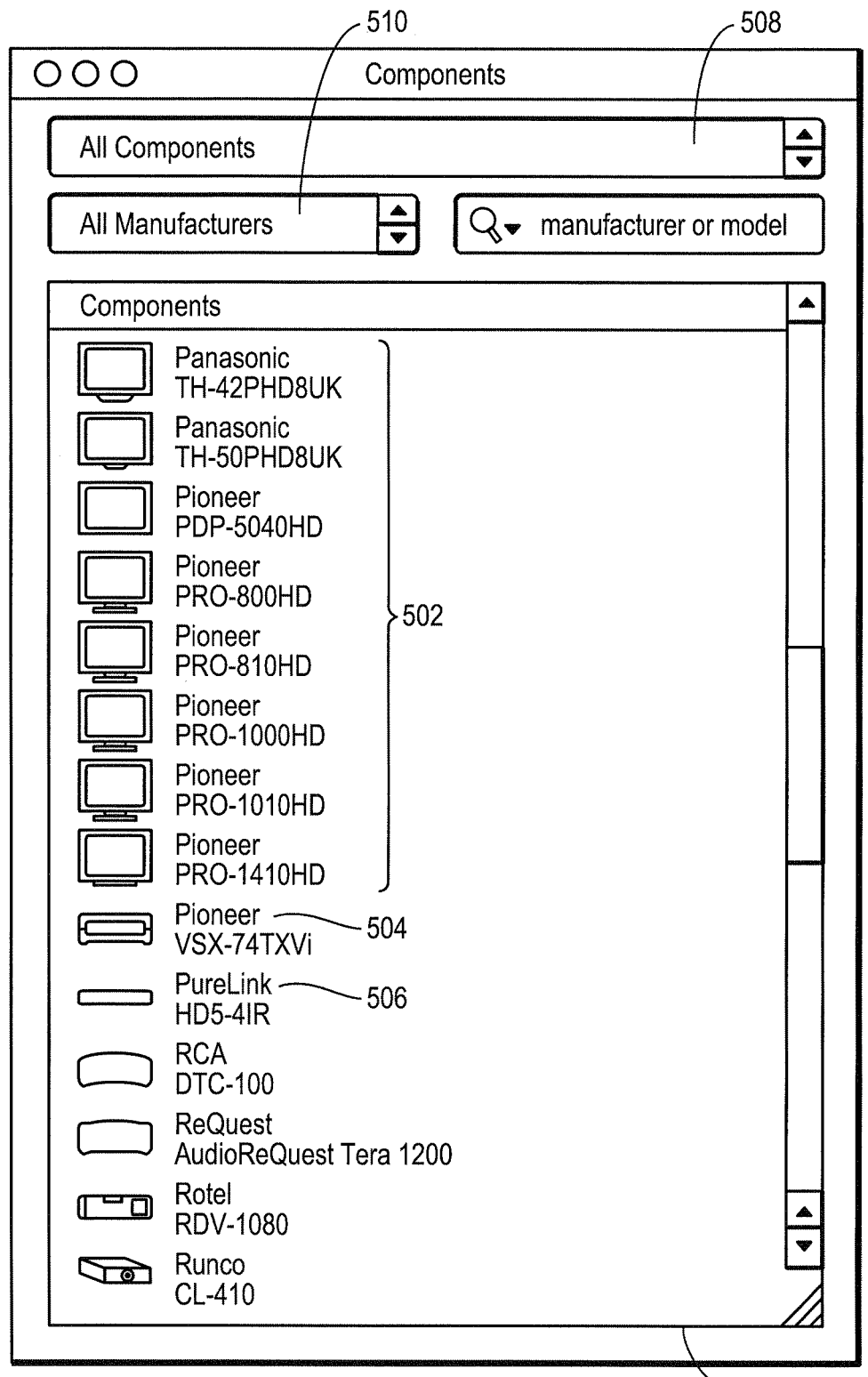
FIG. 5 is a screenshot of a component library used in conjunction with the configuration tool.

To begin to create a configuration, a user clicks on the show palette button 408. As shown in FIG. 5, this action causes a palette of icons representing components in a component library 500 to appear. In this example, several models of flat panel televisions 502 are available in the component library 500 as are a digital surround receiver 504, an HDMI switcher 506, and numerous other components. A user may simply drag and drop icons from component library 500 to a desired zone within zone map 404. Thus, through a series of such drags and drops, a user may specify all of the components which he or she has or wishes to install in a specified zone. To expedite the process, a user may access a menu 508 to display only a particular type of component (e.g., receivers, DVD players, speakers, cable TV converters, etc.) or a menu 510 to display only components made by a particular manufacturer.

Figure 6A:
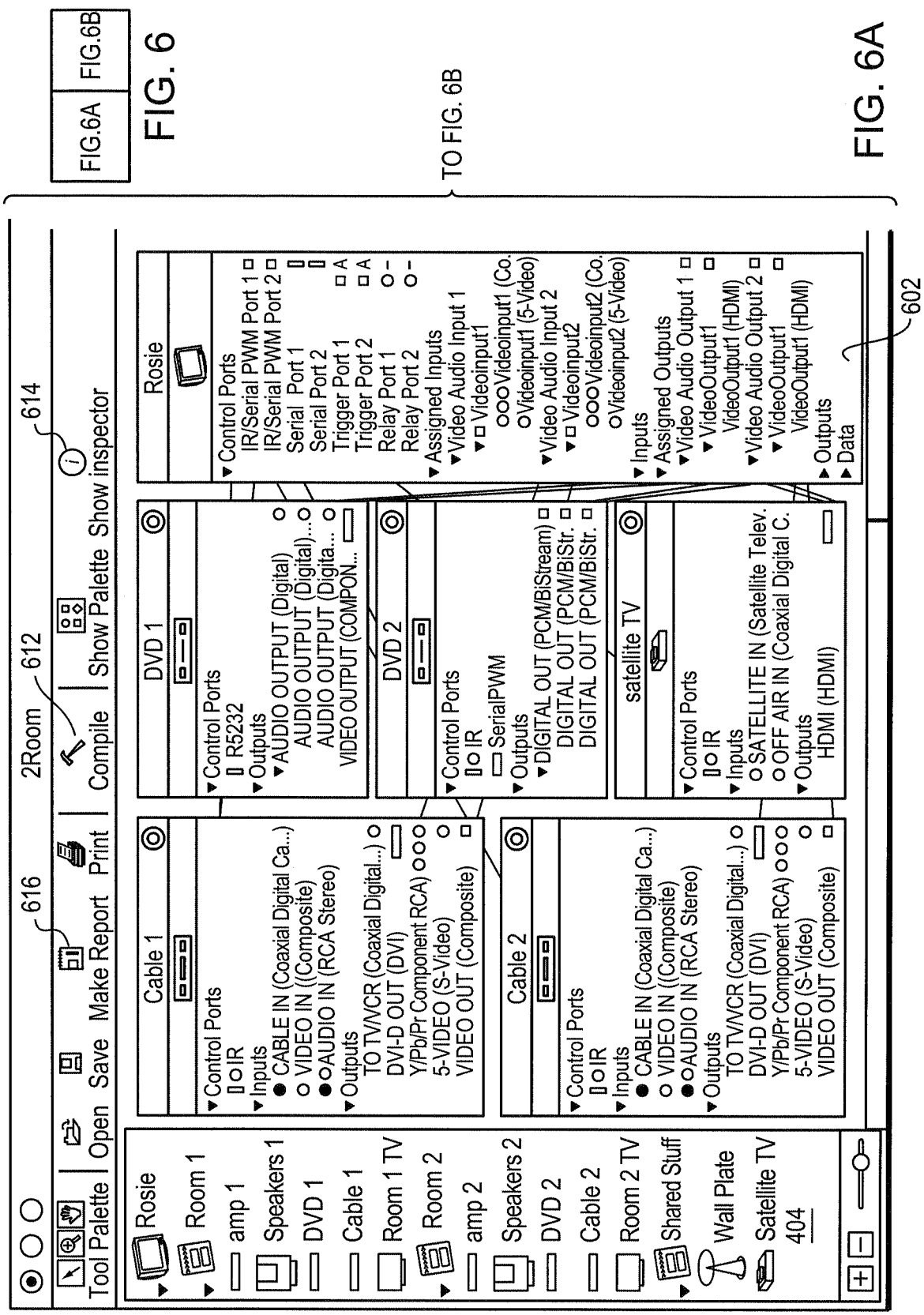
FIG. 6A and FIG. 6B together are a screenshot of a two room configuration created with the configuration tool.
Figure 6B:
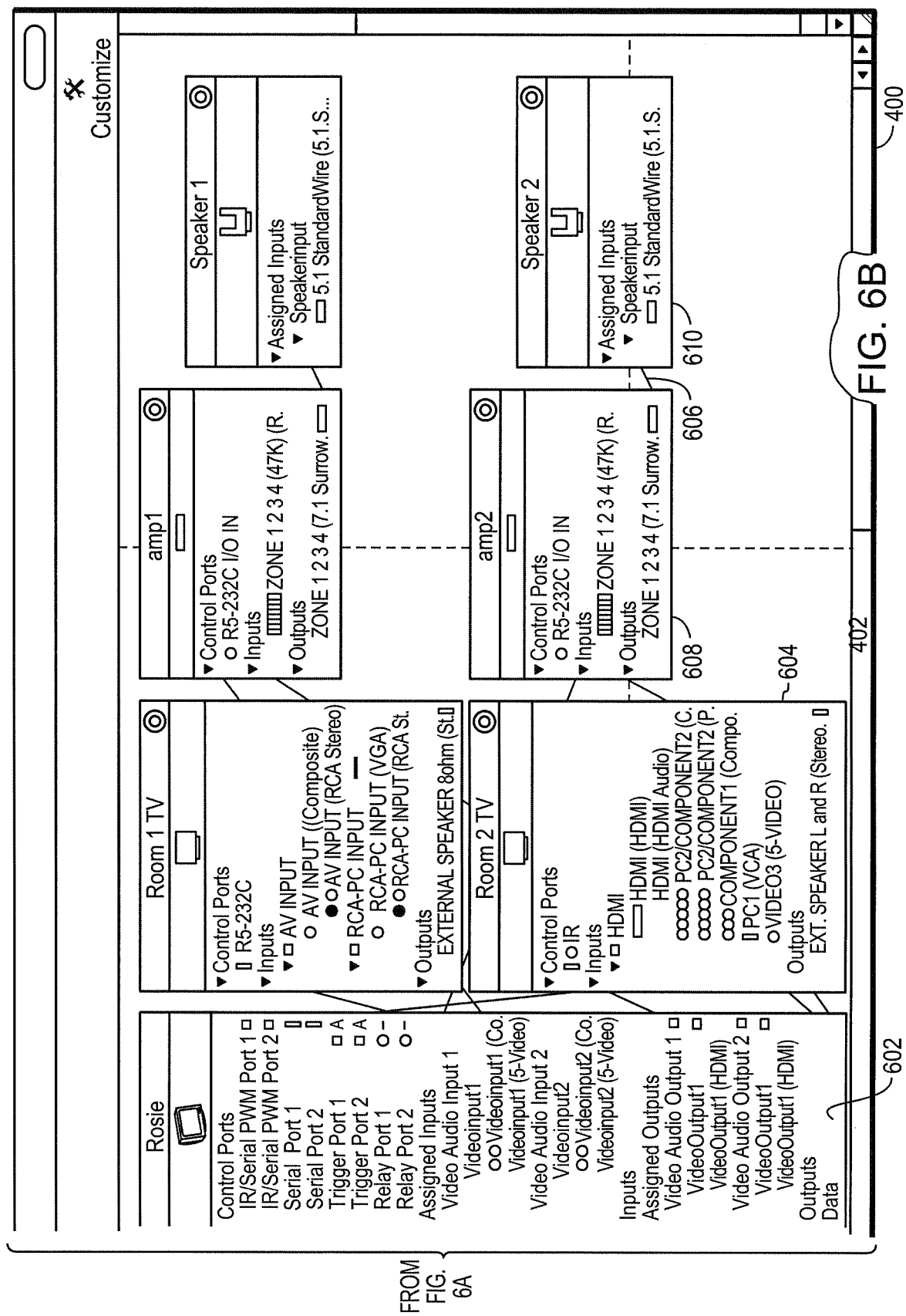

After the user has dragged and dropped components into the zone map 404, those components are dragged and dropped from the zone map 404 into workspace 402. As each component dropped into workspace 402, a box appears as shown in FIG. 6A and FIG. 6B. For example, box 602 represents a programmable multimedia controller 100 within graphical programming environment 400. Similarly, box 604 represents a flat panel television. As shown, each box contains a photograph or other image of the physical component to which it corresponds, which provides a convenient visual reference for the user. In addition, each box contains text and graphics which identify all inputs, outputs and control ports present on the corresponding component. The text also identifies signal type, connector type and other pertinent information about each input, output and control port. The graphics include color coding which matches the colors that appear on the physical component.

Figure 6C:
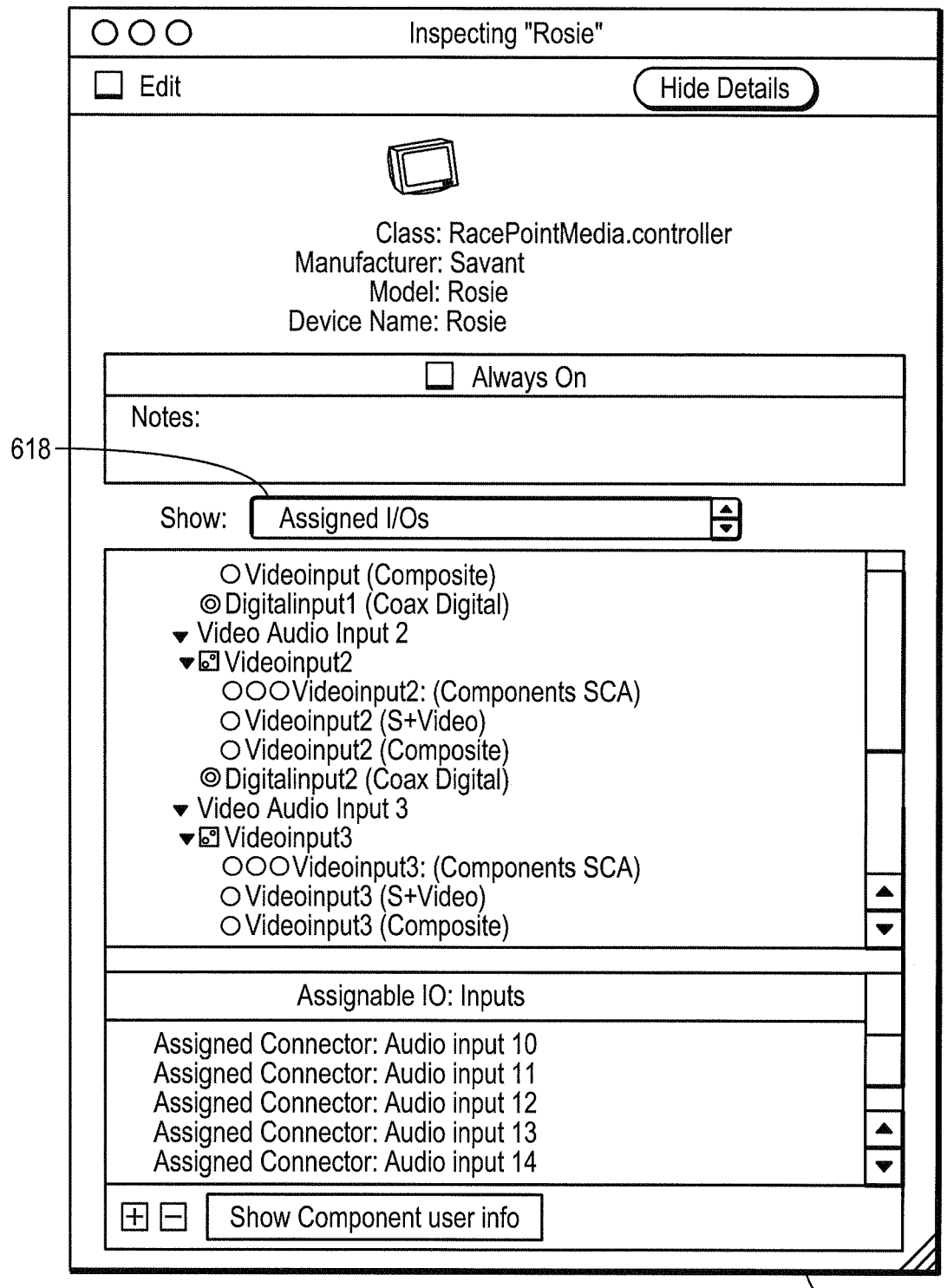
FIG. 6C is a screenshot of a component inspector tool by which a user may view detailed information on a component or customize or configure a component.

Another aid which is provided to assist the user in configuration is a component inspector tool. As shown in FIG. 6A and FIG. 6B, a user may select a component of interest in zone map 404 and then click on a button labeled "Show Inspector" denoted by reference number 614. In response, a screen 616 as shown in FIG. 6C will appear. A menu 618 permits a user to examine detailed information on inputs, outputs, control ports and other aspects of the selected component. Through screen 616 a user may also configure (i.e., for components that require configuration such as programmable multimedia controllers, modular receivers having programmable input/output slots and the like) or customize the selected component.

Using a mouse, a user "draws" connections between the boxes (components) appearing in workspace 402. These connections appear as lines such as line 606, which represents a connection between an output of an amplifier 608 and a set of surround speakers 610. Another way a user may make connections is to right click on a connector (displayed within a box) and cause a popup menu to open which displays information on what types of connectors are compatible, directly or by way of conversion, as well as those which are incompatible and then select the desired connection from that menu.

A user may click on a "Make Report" button denoted by reference number 616. This action causes the underlying software to generate an output report which may contain detailed wiring instructions for the specified configuration, a summary of the components in the configuration, special instructions, user-entered notes and the like. The output report may serve a bill of materials, wiring checklist and installation instruction sheet.

Once a user has completed necessary connections, he or she clicks on a "Compile" button 612. This action causes the underlying software to automatically analyze the specified configuration to determine which "services" the configuration is capable of performing ("realized services") and to identify other services that might be available if the configuration is modified. For a more detailed description regarding "services" as well as "resources" and "requests" as used herein, reference should be made to co-pending application Ser. No. 11/314,112.

Figure 7:
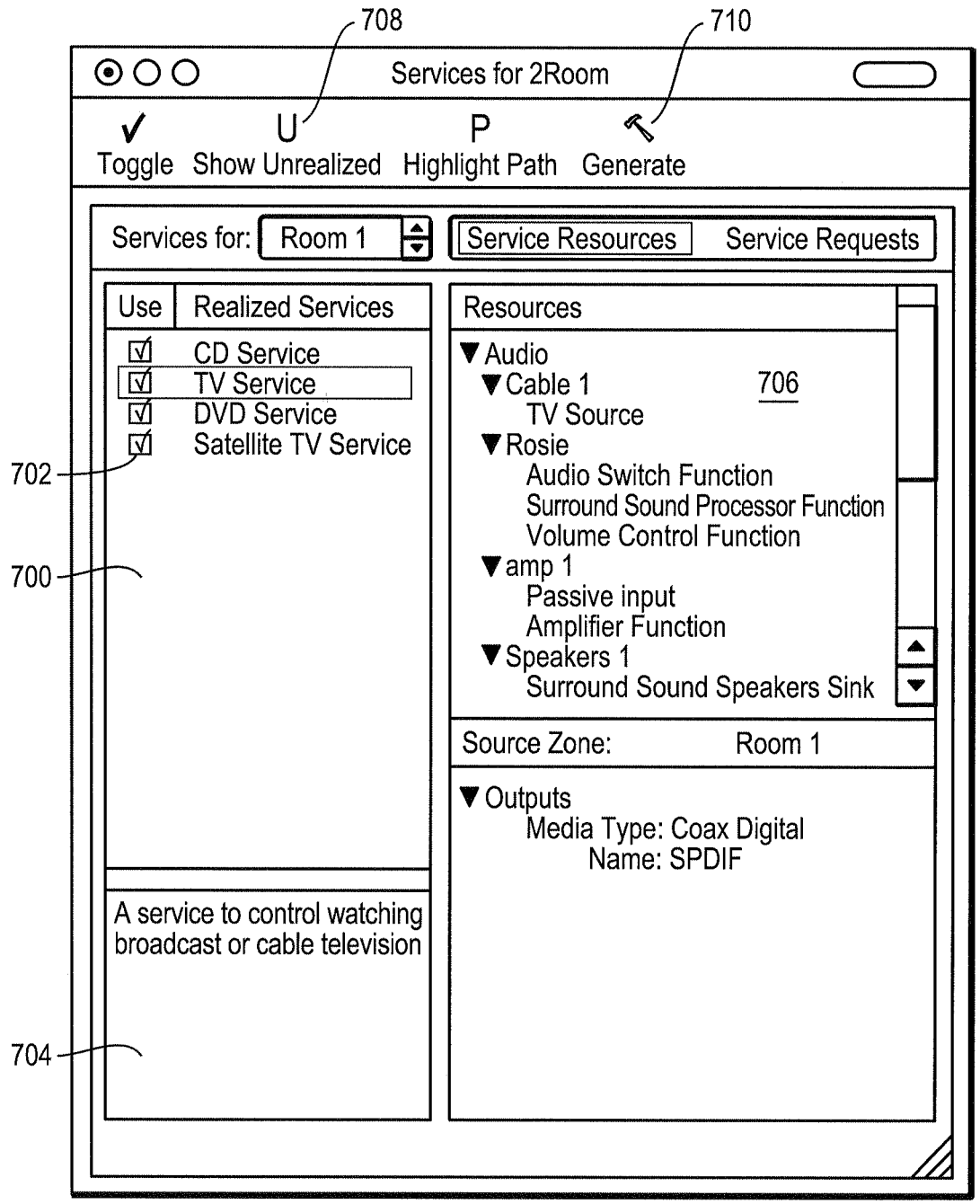
FIG. 7 is a screenshot showing a configuration compilation for the configuration of FIG. 6A and FIG. 6B

As shown in FIG. 7, a list of realized services 700 is displayed to the user. When selected with a mouse, a description of a realized service appears in a panel 704. A user may disable any realized service by use of a checkbox 702. A panel 706 displays all of the resources that are associated with the selected service. By clicking on a "Show Unrealized" button 708, a user may view "unrealized services" which are services that might be provided if the specified configuration is modified. Viewing unrealized services is useful as a tool for debugging a configuration as well as optimizing component usage and user experiences for a given set of components.

Figure 8:
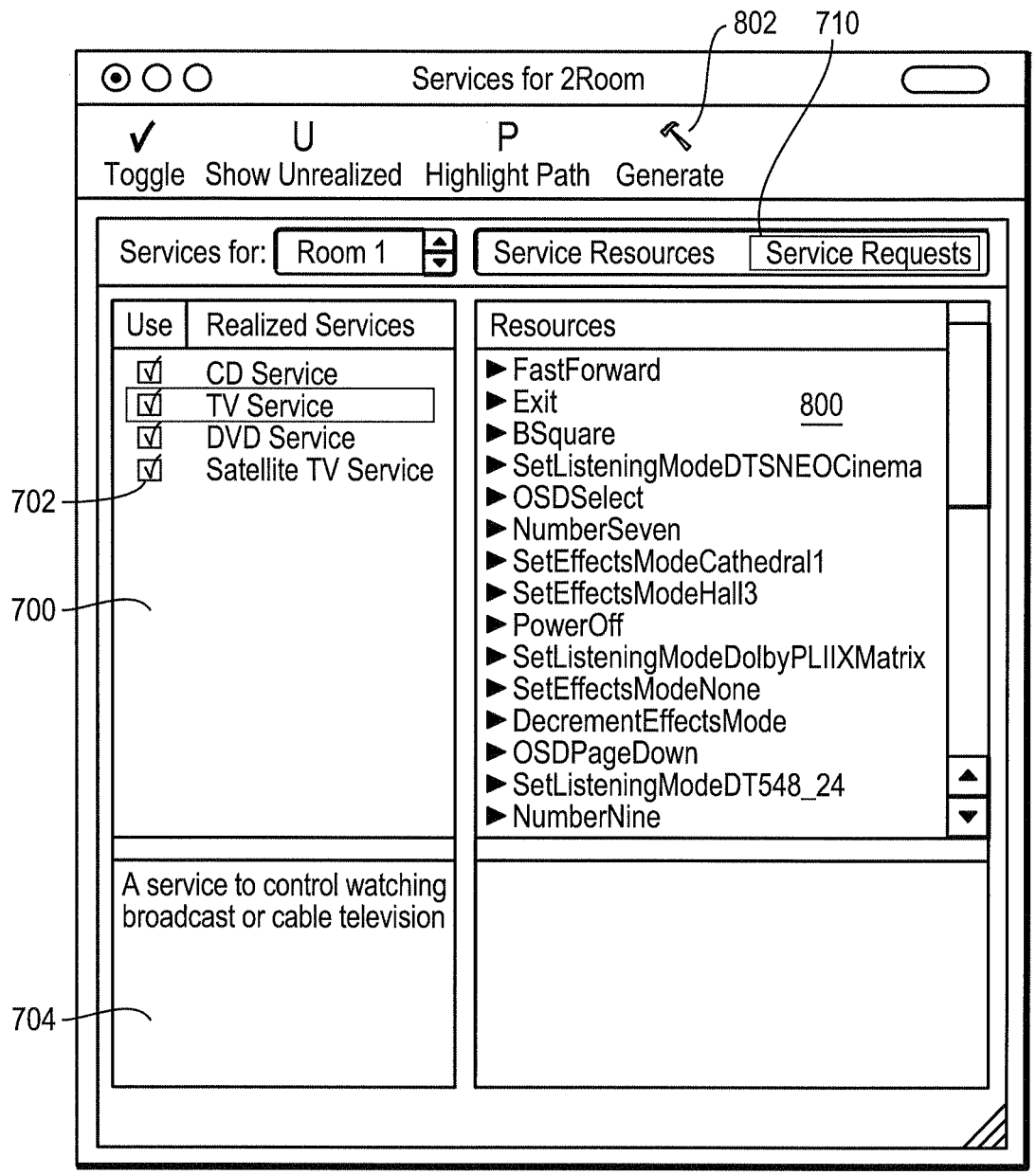
FIG. 8 is a screenshot showing a tool by which a user may customize services.

Once a user is satisfied with the configuration and customization, he or she clicks on a "Generate" button 710. This action causes the underlying software to create the actual system configuration for the programmable multimedia controller 100 and to display a screen like that shown in FIG. 8. As shown in FIG. 8, the requests associated with the realized service "TV Service" are displayed in a panel 800. Within panel 800, a user may customize a realized service by adding or deleting requests.

Figure 10:
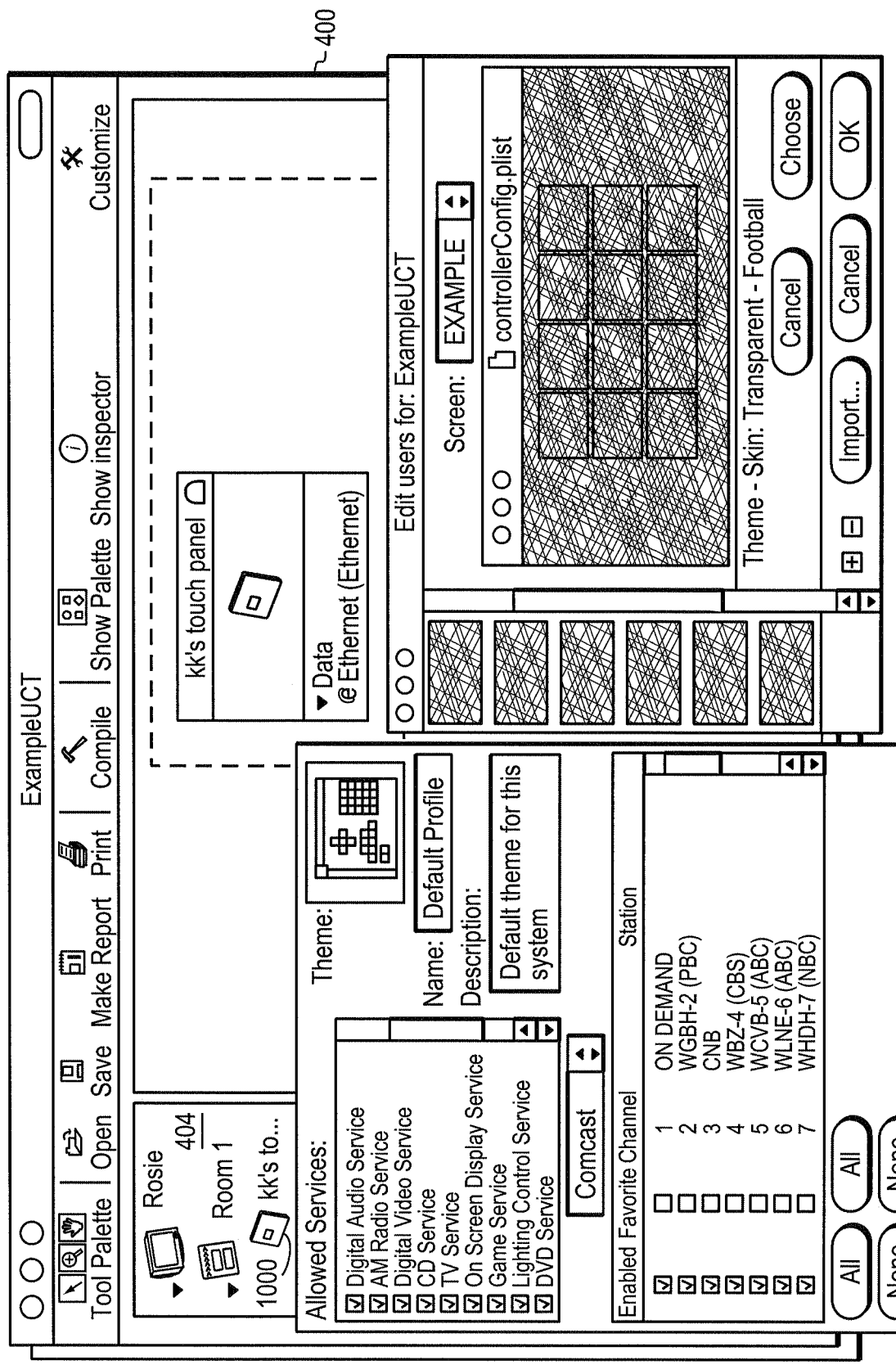
FIG. 10 is a screenshot showing the graphical programming environment of FIG. 4 in which a user may create a component configuration or modify a user interface appearance or user profile using the configuration tool.

In addition to the uses described above, graphical programming environment 400 and configuration tool 350 may be used to configure individual components or devices which interface with programmable multimedia controller 100. As shown in FIG. 10, for example, a touchscreen remote control 1000 which is sold by the assignee of the present invention may be included in component library 500 (FIG. 5). Once dragged and dropped into zonemap 404, configuration tool 350 may be used to configure options specific to such a touchscreen including user interface appearance (i.e., theme and skin) and user profiles. Detailed information regarding user profiles may be found in co-pending application Ser. No. 11/314,112.

Figure 9:
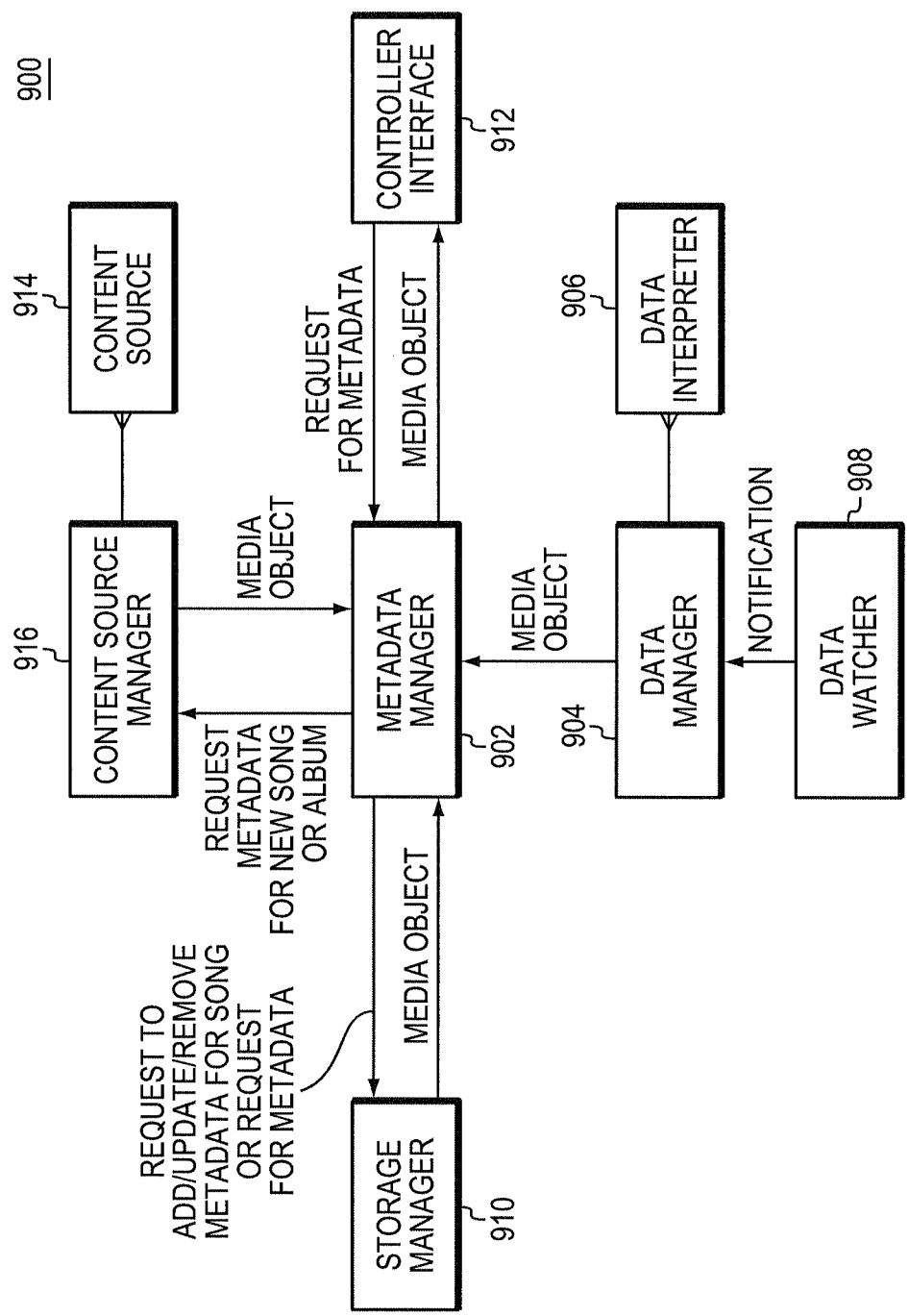
FIG. 9 is a functional block diagram of a metadata management facility which may be incorporated in the programmable multimedia controller of FIG. 1.

In accordance with another aspect of the present invention, programmable multimedia controller 100 may include a metadata management facility for collecting, organizing and distributing metadata within controller 100 as well as to user remote controls which are interfaced to controller 100. FIG. 9 is a functional block diagram of a metadata management facility 900. A metadata manager 902 is responsible for several functions including responding to requests for metadata received from a controller interface 902, receiving new metadata from a data manager 904 or content source manager 916, and passing new metadata to a storage manager 910.

A data watcher 908 is responsible for monitoring all possible media sources for the introduction of new media. For example, data watcher 908 detects the loading of a new CD into a CD player which is connected to the programmable multimedia controller 100, the connection of an MP3 player to controller 100, the insertion of a thumb drive into controller 100 and the like.

When data watcher 908 detects the presence of new media, it generates a notification to data manager 904. Data manager 904 responds to such a notification by creating a media object which initially contains information regarding the file type, file path (if applicable) and the physical source of the new media. Data manager then forwards the media object to a data interpreter 906 which corresponds to the type of media detected (e.g., MP3 file). Data interpreter 906 works to extract as much metadata as possible from the new media source. For example, in the case of an MP3 file, data interpreter 906 may use the collect as much metadata as possible from the ID3 tag which is part of the file. All extracted metadata is encapsulated in an object and returned to data manager 904 which forwards it to metadata manager 902.

In many cases, the new media source that was detected by data watcher 908 will not contain all metadata that exists for a particular song or album. In an effort to capture the missing metadata, metadata manager 902 may issue a request to content source manager 916 which, in turn, may access one or more content sources 914 which are external to programmable multimedia controller 100. Content source 914 may represent a website or other remote information source which can be accessed over the Internet or other network. Additional metadata which content source manager 916 captures is returned to metadata manager 902 and eventually passed to storage manager 910 for storage.

Storage manager 910 has overall responsibility for storing, retrieving, updating or removing metadata in response to queries or messages received from metadata manager 902. In one embodiment in which programmable multimedia controller 100 includes a Mac computer from Apple Computer, Inc., as described in detail in co-pending application Ser. No. 11/314,664, storage manager 910 may be implemented as a database containing stub files. Such files may be indexed and queried very efficiently using Spotlight, a metadata search engine included in Mac OS X.

Controller interface 912 is responsible for communications between metadata manager 902 and user controllers such as touchscreen remote control 112 (FIG. 1). Controller interface 912 is also responsible for ensuring that all user controllers have access to the most current metadata. This may be accomplished by using rsync, a synchronization function, which is party of Mac OS X.

Figure 11:
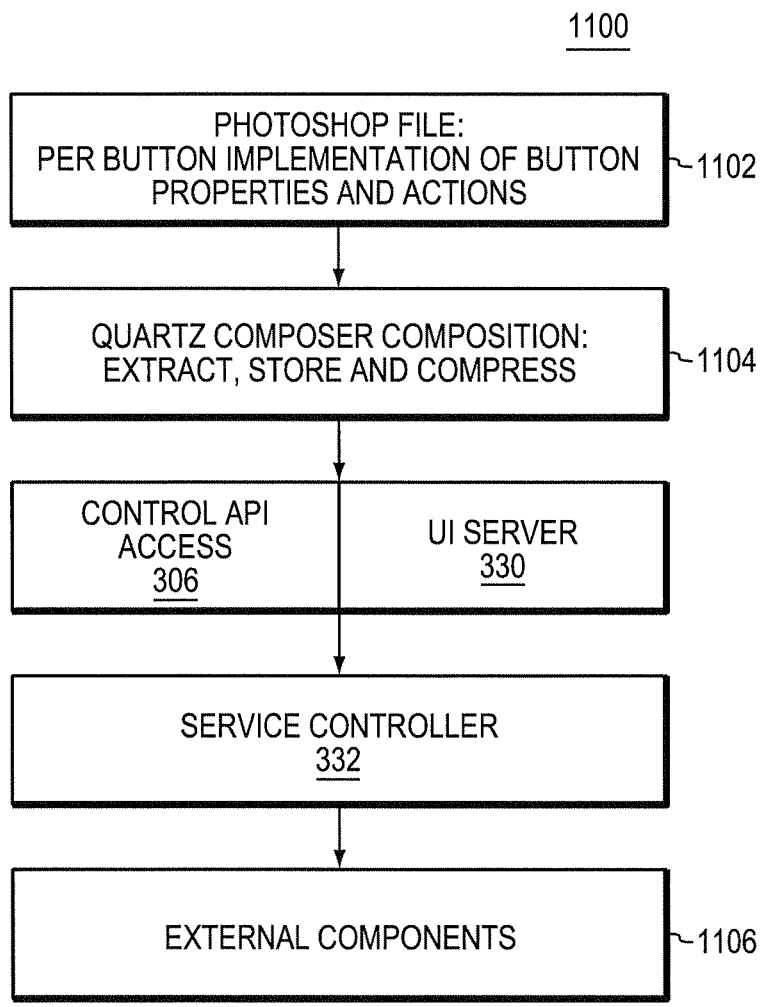
FIG. 11 is a flowchart showing the high level architecture of the software used to define and display a graphical user interface for the programmable multimedia controller of FIG. 1.

In accordance with another aspect of the present invention, a graphical user interface for use with programmable multimedia controller 100 is based on a software architecture which enables easy modification of the appearance, functionality or other attributes of the interface. FIG. 11 shows a software architecture 1100 for a graphical user interface. In a preferred embodiment in which a Mac computer is incorporated within programmable multimedia controller 100, Adobe Photoshop® software, which is included in Mac OS X, is used to create files 1102. A Photoshop® file 1102 is preferably created for each element or screen of a graphical user interface, like the screen shown in FIG. 13, or for some other convenient unit up to and including an entire user interface.

Each Photoshop® file 1102 contains information, preferably organized in "groups" and "layers," which define the appearance, functionality and other attributes of each element of a graphical user interface. The information in a file 1102 may include notes, labels, text-to-speech commands, system control commands, graphics corresponding to different states of a radio button or other user control (e.g., enabled, pressed, mouseover), display text, font size, color, sound effect and button/control type among others.

Files 1102, which are typically stored on non-volatile media such as a hard drive, are read 1104 by Quartz Composer, another piece of software which is also included within Mac OS X, and a run-time environment that loads Quartz Composer compositions. Quartz Composer functions to parse Photoshop® files 1102, thereby extracting all of the embedded groups and layers for the whole file, as well as for each radio button or other control.

Quartz Composer "patches" access the extracted information and, using a Quartz Composer function called "output ports", pass appropriate commands and information from a patch to control API access 306 (FIG. 3) and user interface (UI) server 330. This arrangement provides a powerful programming capability because it permits an author of a Quartz Composer composition direct access to multiple layers of graphics as well as any other information stored in a file 1102. Stated another way, by simply altering the information contained in a file 1102, an author, using widely available and familiar software, may easily and rapidly configure, modify or customize any aspect of the graphical user interface represented by that file.

In response to commands and information received from patches via output ports, control API access 306 and UI server 330 issue appropriate commands and information to service controller 332 (FIG. 3). Service controller 332, in turn, issues appropriate commands to external components 1106 to effect whatever action a user has indicated through the graphical user interface.

Figure 12:
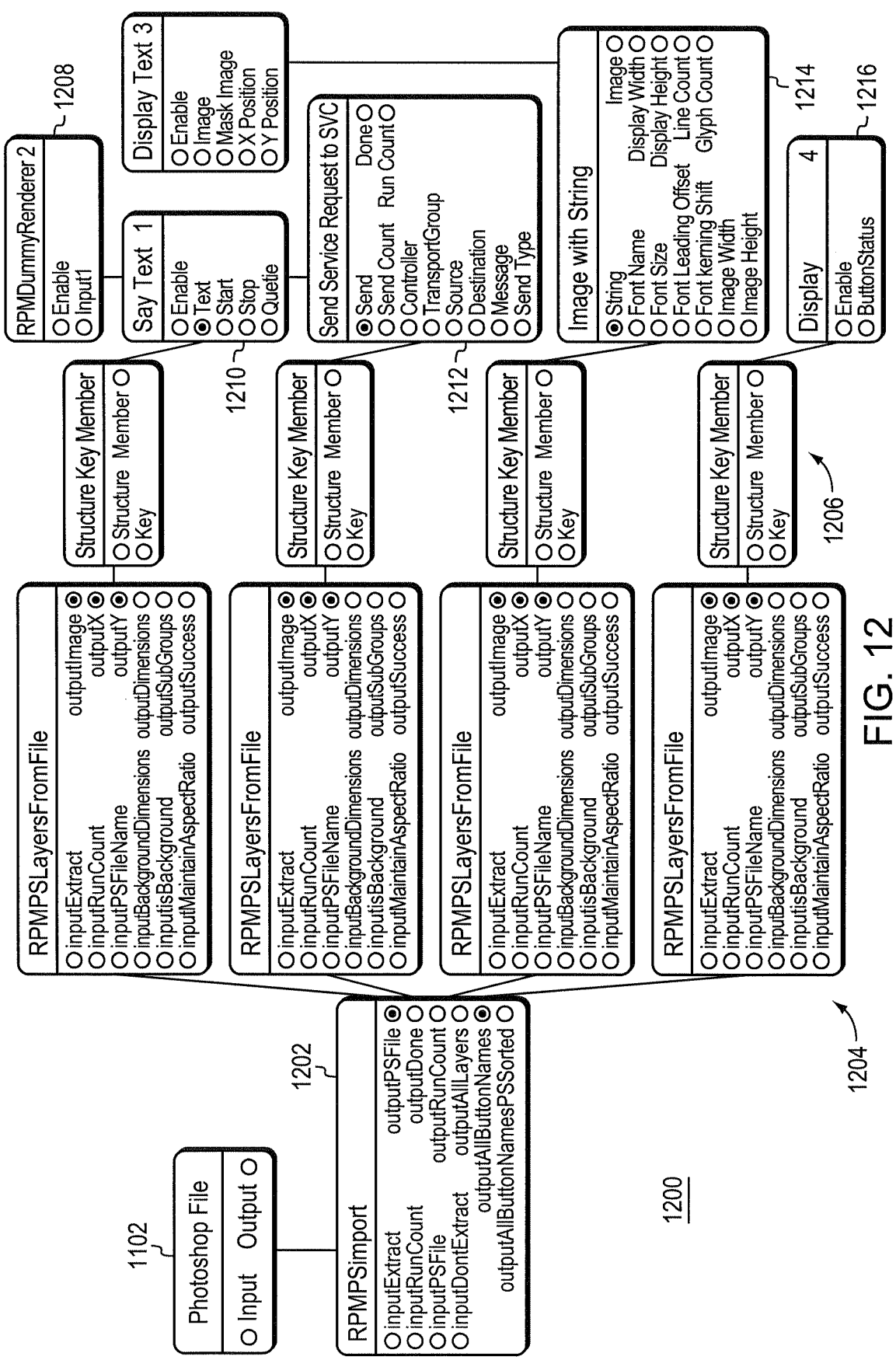
FIG. 12 is a graphical programming environment showing a series of patches which are used to implement a graphical user interface for the programmable multimedia controller of FIG. 1.

FIG. 12 shows a on-screen display 1200 of a series of Quartz Composer patches. A Photoshop® file 1102 is passed to an input of an "Import" patch 1202. Import patch 1202 produces several outputs one of which is the extracted Photoshop® file ("outputPSfile") and the names of all of the buttons present in file 1102 ("outputAllButtonNames"). The extracted Photoshop® file is passed to four LayersFromFile patches 1204. Multiple outputs of each of patches 1204 are passed, respectively, to four Structure Key Member patches 1206.

An output from one of patches 1206 is passed to Say Text patch 1210, which performs a text-to-speech function. Similarly, an output from another patch 1206 is passed to Send Service Request to SVC patch 1212, which is responsible for sending appropriate commands and data to service controller 332. The output of a third one of patches 1206 is passed to Image With String patch 1214, which converts text (extracted from file 1102) to an image for display. The output of the remaining patch 1206 is passed to a Display patch 1216 which is responsible for displaying a radio button.

Figure 13:
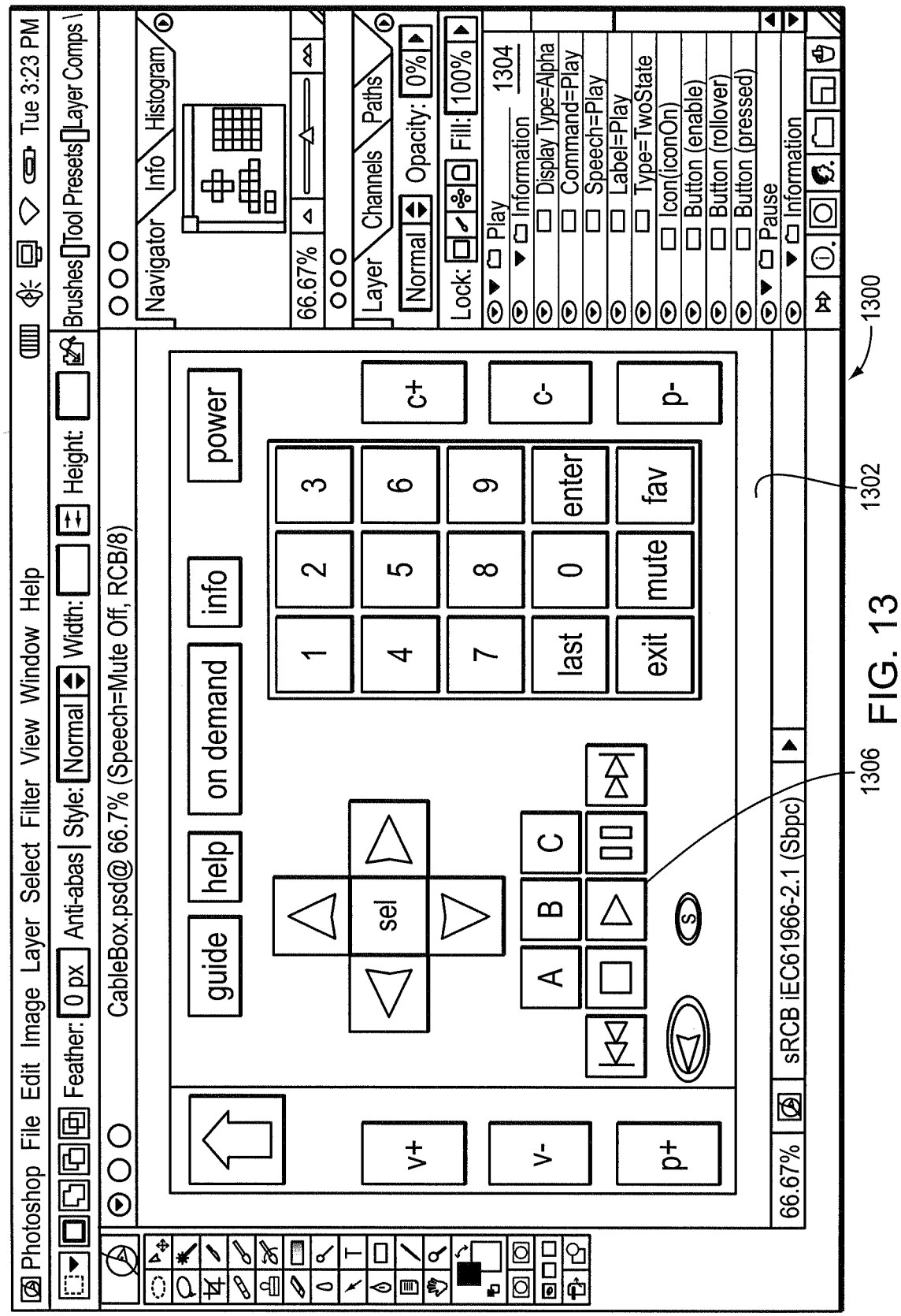
FIG. 13 is a screenshot showing the graphically programmable attributes of a button for performing a "play" function.

FIG. 13 is a screenshot of a graphical programming environment 1300 in which a graphical user interface 1302 for an audio or video component is shown. In area 1304 of environment 1300, the programmable "layers" of functionality and attributes of a "Play" button 1306 are shown. During runtime, when a Photoshop® file corresponding to button 1306 is loaded and a Quartz Composer patch requests the "Command" layer, the result will be the associated audio or video component will be commanded to play.

The foregoing description has been directed to particular embodiments of this disclosure. It will be apparent, however, that other variations and modifications may be made to the described embodiments, with the attainment of some or all of their advantages. Additionally, the procedures or processes described above may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
    presenting, by a configuration tool executing on an electronic device, one or more screens for creating a system configuration for a system of components in a home, the components including at least one audio/video component, lighting component or heating ventilation and air conditioning (HVAC) component;
    displaying, in the user interface screens, a plurality of icons representing components;
    for each of a plurality of components for inclusion in the system, receiving, in the user interface screens:
        a selection by a user of one of the plurality of icons, and
        an indication by the user of a zone of the home in which a component represented by the icon is located;
    accessing a component profile of each of the plurality of components regarding the component's capabilities; and
    based on the indication of the zone of the home in which each of the plurality of components is located and the component profiles:
        determining, by the configuration tool executing on the electronic device, one or more services available in each zone, wherein each service is provided by a group of the components, and
        generating, by the configuration tool executing on the electronic device, the system configuration, wherein the system configuration uses respective groups of components in the home to provide the one or more services.

2. The method of claim 1, further comprising:
    receiving, in the user interface screens, for at least one of the plurality of components, a selection by the user of one or more configurable options of the respective component,
    wherein the generating the system configuration is further based on the configurable options.

3. The method of claim 2, wherein the one or more configurable options include a user interface appearance.

4. The method of claim 1, wherein the receiving the indication by the user of the zone comprises:
    receiving a user drag and drop of the icon to a representation of the zone in a zone map to indicate installation of the component represented by the icon in the zone.

5. The method of claim 1, further comprising:
    receiving, in the user interface screens, drawn connections between two or more of the plurality of components,
    wherein the generating the system configuration is further based on the drawn connections.

6. The method of claim 1, wherein the electronic device is a programmable multimedia controller configured to control the system of components.

7. The method of claim 1, further comprising:
    producing a user interface for controlling the system of components in the home based on the system configuration, the user interface including one or more text-to-speech commands usable to control the one or more services.

8. A method comprising:
    presenting, by a configuration tool executing on an electronic device, one or more screens for creating a system configuration for a system of components in a home, the components including at least one audio/video component, lighting component or heating ventilation and air conditioning (HVAC) component;
    displaying, in the user interface screens, a plurality of icons representing components;
    for each of a plurality of components for inclusion in the system, receiving, in the user interface screens:
        a selection by a user of one of the plurality of icons, and
        an indication by the user of a zone of the home in which a component represented by the icon is located;
    based on the indications of the zone of the home in which each of the plurality of components is located, determining, by the configuration tool executing on the electronic device, one or more services available in each zone, wherein each service is provided by a group of the components;
    generating, by the configuration tool executing on the electronic device, the system configuration; and
    producing a user interface for controlling the system of components in the home based on the system configuration, the user interface including one or more text-to-speech commands used with the one or more services.

9. The method of claim 8, further comprising:
    receiving in the user interface screens, for at least one of the plurality of components for inclusion in the system, a selection by the user of one or more configurable options of the respective component,
    wherein the generating the system configuration is further based on the configurable options.

10. The method of claim 8, wherein the receiving the indication by the user of the zone comprises:
    receiving a user drag and drop of the icon to a representation of the zone in a zone map to indicate installation of the component represented by the icon in the zone.

11. The method of claim 8, further comprising:
receiving, in the user interface screens, drawn connections between two or more of the plurality of components, wherein the generating the system configuration is further based on the drawn connections.

12. The method of claim 8, wherein the electronic device is a programmable multimedia controller configured to control the system of components.

13. The method of claim 8, wherein the one or more text-to-speech commands are extracted by a run-time environment that implements the user interface.

14. An electronic device, comprising:
a storage device configured to store a configuration tool;
a display configured to show one or more screens of the configuration tool usable to create a system configuration for a system of components in a home; and
a processor configured to execute the configuration tool, the configuration tool when executed operable to:
for each of a plurality of components for inclusion in the system, receive, on the user interface screens shown on the display, an indication of a zone of the home in which the component is located,
access a component profile of each of the plurality of components regarding the component's capabilities,
based on the indications of the zone of the home in which each of the plurality of components is located and the component profiles, determine one or more services available in each zone, wherein each service is provided by a group of the components, and generate the system configuration to use respective groups of components in the home to provide the one or more services.

15. The electronic device of claim 14, wherein the configuration tool when executed is further operable to:
receive in the user interface screens shown on the display, for at least one of the plurality of components for inclusion in the system, a selection by the user of one or more configurable options of the respective component,
wherein the system configuration is generated further based on the configurable options.

16. The electronic device of claim 15, wherein the one or more configurable options include a user interface appearance.

17. The electronic device of claim 14, wherein the indication of the zone is a user dragging and dropping an icon representing the component to a representation of the zone in a zone map to indicate installation of the component represented by the icon in the zone.

18. The electronic device of claim 14, wherein the configuration tool when executed is further operable to:
receive, in the user interface screens on the display, drawn connections between two or more of the plurality of components,
wherein the system configuration is generated further based on the drawn connections.

19. The electronic device of claim 14, wherein the electronic device is a programmable multimedia controller configured to control the system of components.

* * * * *